No. 843,374. PATENTED FEB. 5, 1907.
G. B. STURGEON.
ROLLING PARALLEL RULER AND SLIDING SCALE.
APPLICATION FILED AUG. 12, 1905.

Witnesses.
T. Castberg
J. H. Towse

Inventor.
George B. Sturgeon
By Geo. H. Strong. Atty.

UNITED STATES PATENT OFFICE.

GEORGE B. STURGEON, OF WAILUKU, HAWAII.

ROLLING PARALLEL RULER AND SLIDING SCALE.

No. 843,374.      Specification of Letters Patent.      Patented Feb. 5, 1907.

Application filed August 12, 1905. Serial No. 273,934.

*To all whom it may concern:*

Be it known that I, GEORGE B. STURGEON, a citizen of the United States, residing at Wailuku, Maui, and Territory of Hawaii, have invented new and useful Improvements in Rolling Parallel Rulers and Sliding Scales, of which the following is a specification.

My invention relates to the combination of rolling parallel rulers with sliding scales, and its objects are to obtain the greatest possible control in the movements of the parts and the quickest manipulation of the same in the accurate measurement of distances required in the various operations to which the scale may be applied.

It consists in the combination of parts and in details of construction which will be more fully explained by reference to the accompanying drawings, in which—

Figure 1:
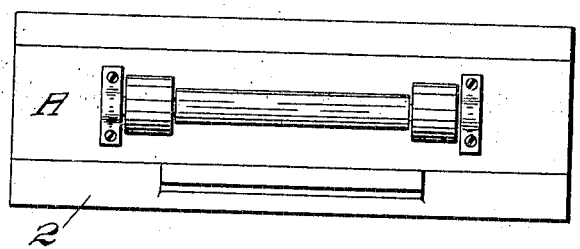
Figure 2:
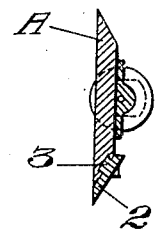

Figures 1 and 2 are a plan and transverse section, respectively, of my rolling parallel ruler. Figs. 3, 4, 5, and 6 are modifications of structure.

In the present system of mapping by the aid of parallel rules the azimuths are carried by the rule from the protractor to any desired portion of the map-sheet, where the azimuth or bearing is drawn off in pencil. The rule is then pushed aside and the required distance along said azimuth is scaled off with the particular scale adopted for the map in question. In some cases a parallel ruler has been used having the edges graduated, but it is open to the disadvantage that when the azimuth has been carried to the required station on the map-sheet an arithmetical calculation is necessary before the required distance can be scaled off, as it is of extremely rare occurrence that the zero or an even hundred graduation coincides with the station. The parallel rule must be shifted until zero or an even hundred mark does coincide with the station from which the azimuth and distance are to be laid off, and this latter movement changes the azimuth. This combination also limits the number of scales that can be employed to the two edges of the rule. If the drawing is being made upon a slanting board, the draftsman loses much time and is at a disadvantage in having to hold an ordinary parallel rule while a separate scale is applied.

In my invention I employ a rolling parallel rule A, having a dovetailed groove or slot in one side. Fitting this slot is the transversely-movable scale or part to which the scale may be clamped.

In the construction shown in Figs. 1 and 2 the scale 2 has a dovetailed projection upon one side, as shown at 3, and this fits a corresponding dovetailed channel upon the upper slanting side of the ruler A. The edge of the scale 2 is beveled so as to coincide with the bottom of the ruler A and may be graduated in any desired manner. The scale thus constructed is then slidable with relation to the portion A, so that when the azimuth has been carried to the required station on the map-sheet the scale may be moved to lay off the desired distance.

Figure 3:
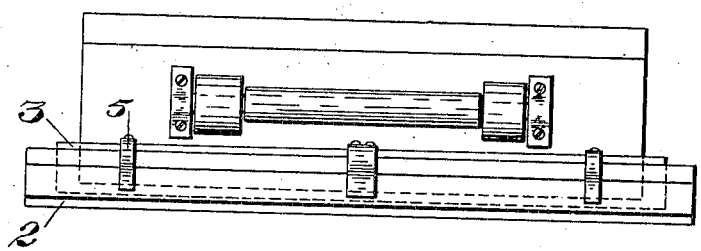
Figure 4:
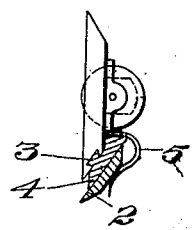

As shown in Figs. 3 and 4, a thin plate 4 is fitted to the edge of the ruler A and has a tongue 3 slidable in the corresponding dovetailed groove in the ruler, as previously described. Upon this slidable plate is clamped the scale 2 by means of clamps 5. These clamps in the present case are represented as springs; but it will be understood that any suitable form may be employed, this form being very suitable, as it allows the scale to be moved along the rule or to be removed or replaced at will.

Figure 5:
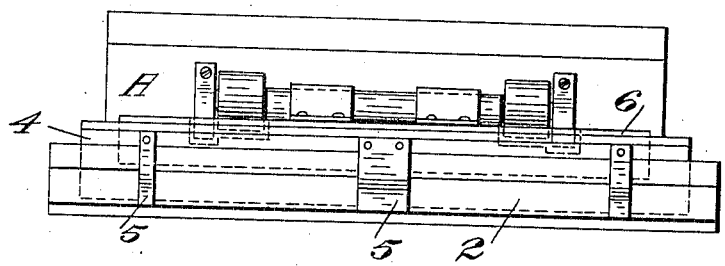
Figure 6:
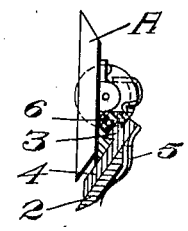

As shown in Figs. 5 and 6, the ruler A carries a plate 6, in which the dovetailed groove is formed, and the thin plate 4 has a tongue 3 formed upon its under side, as previously described. This tongue is fitted and slidable in the dovetailed groove of the part 6. The spring or other clamp 5 is fixed to the slidable plate 4, and the graduated scale 2 is in this case held by the clamps upon the slidable plate 4.

Under either of these constructions the scale is carried along with the parallel rule to the required station. The scale is then easily slid to the right or left, as the conditions may require, until zero or an even hundred mark, or the required distance coincides with the station, and the distances are marked off. The whole operation is thus quick, accurate, and mechanical. It is a great saving of time, of brain-labor, and a reduction of the chances of error which may occur in the calculations otherwise necessary. This combination will greatly simplify and facilitate the work of architects and all other draftsmen and is particularly adaptable to plotting stadia notes.

Having thus described my invention, what

I claim, and desire to secure by Letters Patent, is—

1. An improved device of the character described having in combination a rule, a roller mounted thereon, a plate parallel with the rule said plate and rule having a tongue-and-groove connection therebetween whereby the plate is slidable relative to said rule, a scale parallel with the plate, and means fixed to the plate and clamping the scale thereto.

2. A device of the character described having in combination a rule having a beveled upper edge said edge being provided with a dovetailed slot, a roller upon which the rule is mounted, a plate lying upon the beveled edge of the rule and having a tongue to slidably engage the slot in the rule, a clamping means having one part fixed to the plate and the other or free part overlying the plate, and a scale between said plate and the overhanging part of the clamping means and engaged by the latter whereby the scale is held to and movable with the plate.

In testimony whereof I have hereunto set my hand in presence of two subscribing witnesses.

GEORGE B. STURGEON.

Witnesses:
V. A. VETLESEN,
JNO. KAWAI.